Sheet 2 – 2 Sheets.
R. N. Eagle,
Animal Shackle,
Nº 62,946.      Patented Mar. 19, 1867.
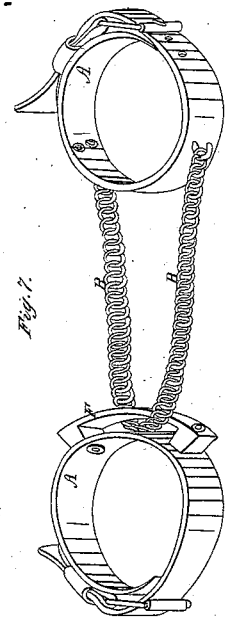
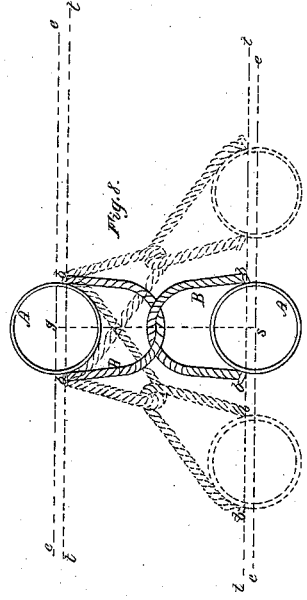
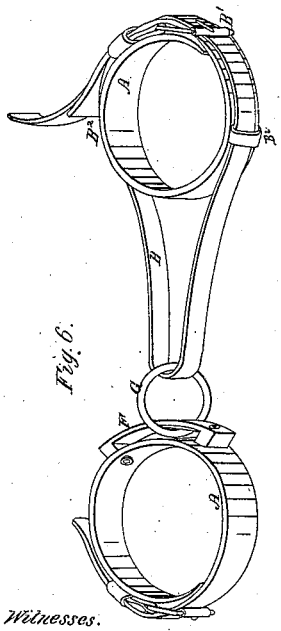
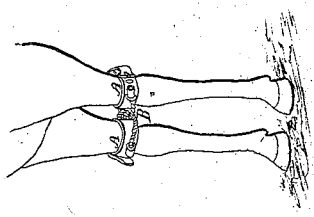
Witnesses.
Chas. D. Smith
Geo. H. Rothwell
Inventor.
R. N. Eagle

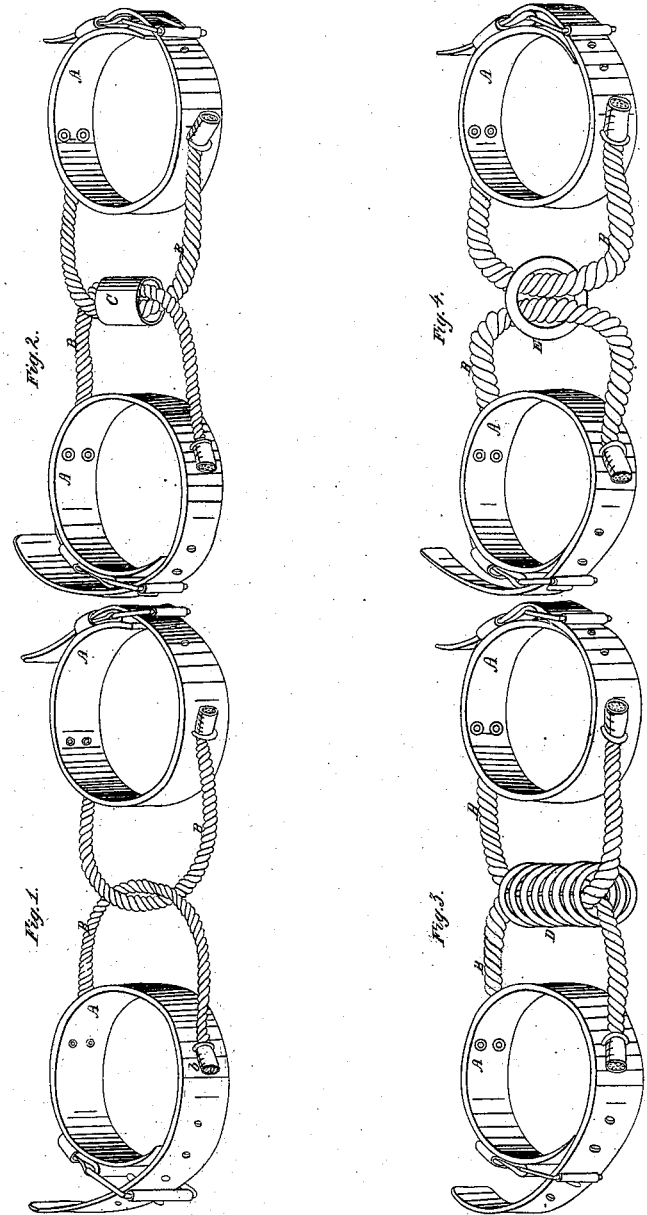

United States Patent Office.

ROBERT N. EAGLE, OF WASHINGTON, DISTRICT OF COLUMBIA.

Letters Patent No. 62,946, dated March 19, 1867.

IMPROVED HOPPLES FOR HORSES.

The Schedule referred to in these Letters Patent and making part of the same.

TO ALL WHOM IT MAY CONCERN:

Be it known that I, ROBERT N. EAGLE, of the city and county of Washington, District of Columbia, have invented certain new and useful improvements in Hopples for Horses and other Animals; and I do hereby declare the following to be a full, clear, and exact description of the same, reference being had to the accompanying drawings, which are made part of this specification, and which represent my invention as embodied in various forms, with a diagram explanatory of the principle upon which the invention is founded.

The object of my present invention is identical with that which was set forth in Letters Patent to me dated April 7, 1863, and numbered 38,100, but the means employed differ in details. In the former I described terminals on the coupling, which had a motion upon bars or loops on the leg-bands. I propose now to employ flexible connecting devices, which may consist of two interlooped cords or straps, whose ends are secured to their respective leg-bands at opposite or nearly opposite points to each other; or, in other words, having their extremities applied at each end of an axis running through the centre of a circle formed by the leg-bands when buckled round the leg, permitting motion upon or across each other to each of the said interlooped connecting devices, equal or nearly equal to the space or spread between their ends, or where they join their respective leg-bands. The motion by such means is virtually transferred from any direct relation with the leg-band to the interlooping connections themselves, which latter will so work or co-operate with each other as to allow a motion of the animal's leg without turning or shifting the said bands upon the legs. In this way the limbs of the animal are effectively connected, the stride or step regulated, and the passage of the leg backward and forward freely permitted, without the objectionable movement or rotation of the lower or main band, A, around or upon the limbs or other parts embraced by it.

The present invention may be thus described: The rope, strap, chain, or other connection belonging to one or each of a pair of leg-bands, is made fast at its ends to said leg-band, but by its own flexibility, together with a provision for a certain degree of play upon or adjustability relatively to its point of connection with its other leg-band, said rope, strap, chain, or other coupling is, under the force which is due to the arrested motion or retarded steps of the animal, made to act at two counteracting points upon its leg-band, so that the latter is freed from any tendency to turn upon the leg. It should be here stated that if the fellow of a leg-band having this novel provision be not similarly provided for, then it should be furnished with some other means against turning, as hereinafter described.

In order that others skilled in the art to which my invention appertains may be enabled to fully understand and use the same, I will proceed to describe it in connection with the accompanying drawings.

A A in each figure represent a pair of leg-bands. The rope B, (or any equivalent flexible coupling applied in the same way, such as a chain or strap,) constitutes the essential feature of the present improvement. The ends of the rope B are applied or permanently attached to the leg-band A, at a suitable distance asunder, it being only necessary that when the band A is in position on the leg, the points of attachment of the rope shall be at opposite sides of a horizontal line drawn through the centre of the animal's leg at right angles to the line of motion.

In Figure 1 the leg-bands are matched in respect to the means of connection, the two ropes being interlooped so as to slide within or upon each other at every step of the animal.

In Figure 2 the interlooped ropes are shown extended or held in approximate parallelism at the point of connection by a short tube, C. This tube is designed to distribute the friction over increased surface and prevent the contiguous parts of the interlooped ropes from bighting or retarding reciprocal motion or play. This last-mentioned object is also attained by the series of rings D, Figure 3, which are also fitted over the interlooped portions of ropes B. A single ring, E, may connect the ropes B, as shown in Figure 4, in which instance the ropes are not interlooped.

In Figure 6 a flexible strap, B, is used, instead of the rope, and this strap is adjustable upon its leg-band A by means of the buckle B¹, so that the said strap may be taken up or let out to increase or diminish the limitation of the animal's steps, as may be found desirable. The loops at B² B² change the points of action of the straps upon each other under the taking up or letting out adjustment of the strap B. The strap B of one leg band is connected to the bar F, through the medium of a ring, G, which has the same effect as the employment of two ropes, B, to wit, to prevent either leg-band, A, from turning upon the leg.

In Figure 7 a chain, B, in direct connection with bar F, is represented in lieu of the rope and ring. In figs. 6 and 7 the action of the strap or chain is the same as that described in connection with the rope B, and the point of connection between the strap or chain, with the bar F, shifts itself upon said bar, so that there can be no tendency to turning on the part of the leg-band to which the bar F is applied. The chain in fig. 7 may be connected to the bar F by a ring, or the strap in fig. 6 may have direct connection with the bar F. The flexible connection B may be used under various other modifications without going beyond the scope of the present invention.

The operation of the connecting rope B, whether one or two be employed in conjunction with a pair of hopples, will be readily understood by reference to Figure 8. The connection between the leg-bands A, embracing one or more ropes, B, imposes restraint or limits the length of the steps of the animal to which the hopples are applied in a degree commensurate with the length of such connection B, as the latter arrests the motion of the leg when it is drawn taut or extended to its full degree. In the diagram, fig. 8, the black lines at A A B B indicate the relative position of the leg-bands and their connecting ropes when the feet of the animal are parallel to each other. The red and blue lines indicate the change of the position of the leg-bands, and also show the adjustment of the connections B B to suit such change in position, which occurs either when the animal steps its near foot forward or backward. Now, by sliding or adjusting themselves in or upon one another, the connections B B are each caused to act or draw upon the leg-bands at their two points of attachment, $b\ b$, with the same effect or tension at each point, $b$, so that the tendency of one point of action, $b$, to turn the leg-band upon the leg of the animal is counteracted by the tendency at the other point of attachment, $b$, to turn the leg-band in the opposite direction. In this diagram (fig. 8) the line $s\ s$ may represent the point of intersection of a horizontal line drawn through the middle of the horse's leg at right angles to the line of motion of the leg. The lines $t\ t$ indicate the points of attachment of the ropes B B, and the unchangeability of such points upon the circles representing the animal's legs when the latter are in motion. If the ropes B B be attached at the points of intersection of the dotted lines $e\ e$ with the leg-bands A A, then a maximum degree of sliding or adjusting play will be allowed the ropes when in operation. Any required number of connecting loops may be used, and the connecting devices which interpose between them, if any are used, may be varied in character and number. The position of the ropes when the animal's feet are abreast of each other is shown in black lines, fig. 8, and the forward and backward motions of the near foot are shown in red and blue lines respectively, same figure.

Having described my invention, what I claim as new, and desire to secure by Letters Patent, is—

A hopple in which the leg-bands are connected by loops which slip upon each other or upon a device interposed between them, or by a single loop connected more directly to another leg-band, as in figs. 5 and 6, substantially as described.

The above specification of my invention signed by me this    day of    , 1867.

R. N. EAGLE.

Witnesses:
  GEO. W. ROTHWELL,
  JAMES L. EWIN.